United States Patent [19]

Gundermann

[11] 4,118,125

[45] Oct. 3, 1978

[54] POLARIMETERS

[75] Inventor: Rolf Karl Gundermann, London, England

[73] Assignee: Optical Activity Ltd., London, England

[21] Appl. No.: 749,475

[22] Filed: Dec. 10, 1976

[30] Foreign Application Priority Data

Dec. 11, 1975 [GB] United Kingdom ............... 50926/75

[51] Int. Cl.² .................... G01N 21/40; G01N 4/04
[52] U.S. Cl. ...................................... 356/116; 356/114
[58] Field of Search .............................. 356/114–119; 250/225; 307/269, 232; 328/133

[56] References Cited

PUBLICATIONS

Cahan, B. D., "A High Speed Precision Automatic Ellipsometer", Surface Science, 16, pp. 166–177, 1969.

Primary Examiner—John K. Corbin
Assistant Examiner—Wm. H. Punter
Attorney, Agent, or Firm—Donald D. Jeffery

[57] ABSTRACT

A polarimeter comprises a polariser and an analyser between which is disposed a sample whose optical activity is to be determined. Light passes through the polariser, sample and analyser to a light detector responsive to the intensity of the light transmitted by the analyser. The polariser has a fixed orientation and the analyser is rotated by a motor which is driven in synchronism with digital clock pulses. The phase of the output signal from the light detector is compared with the phase of a digital signal derived from the clock pulses to determine the optical activity of the sample.

5 Claims, 1 Drawing Figure

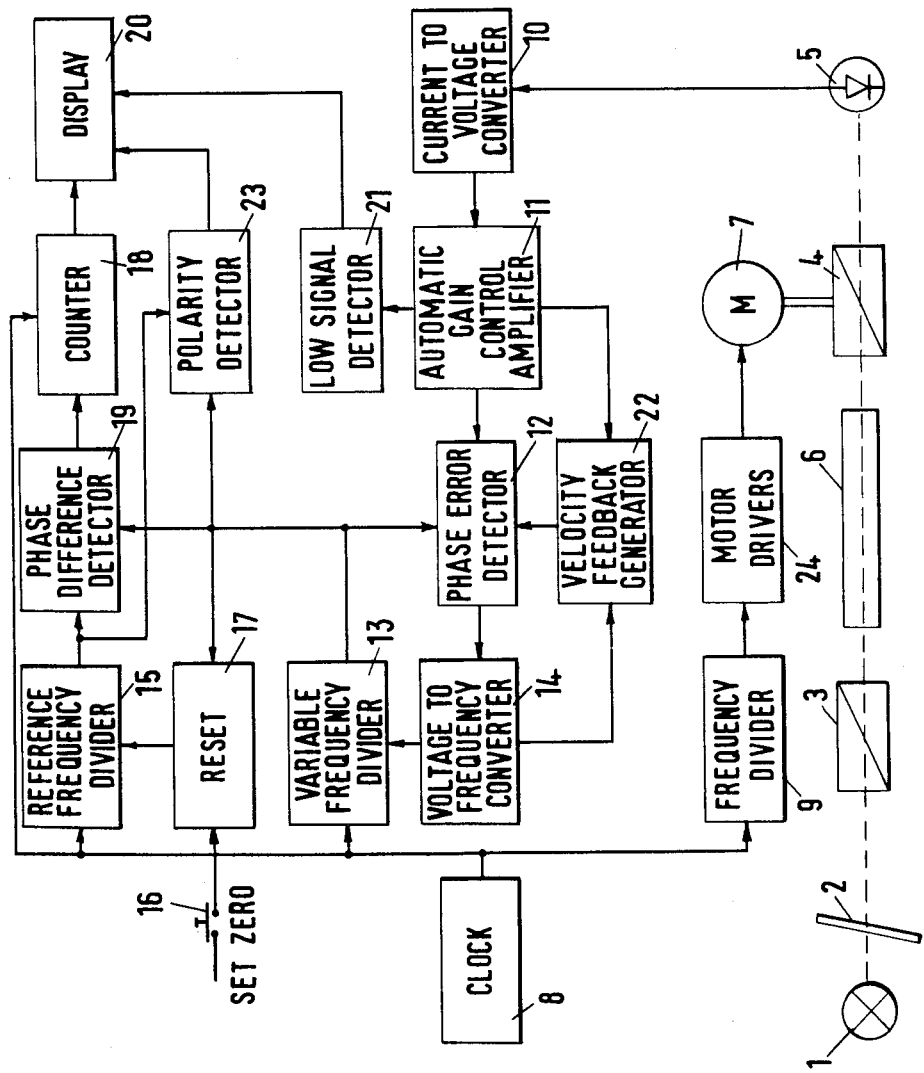

POLARIMETERS

BACKGROUND OF THE INVENTION

This invention relates to a polarimeter.

In particular, the invention concerns a polarimeter of the kind which includes a polariser having a fixed orientation and an analyser which is rotatable about its axis. In such a polarimeter the analyser is rotated at constant speed about its axis and the resulting modulation of the light intensity is detected by a light detector arranged to detect the intensity of light transmitted by the analyser. The electrical output signal of the light detector in these circumstances is a $Sin^2$ waveform of two cycles per revolution of the analyser. When a sample, the optical activity of which is to be measured, is placed between the polariser and the analyser, the phase of the output signal of the light detector is shifted in relation to the angular position of the analyser by an amount which is proportional to the optical rotation introduced by the sample. Measurement of this phase shift in the output signal of the detector thus gives a measure of the optical activity of the sample.

Known polarimeters of this kind have employed electrical signals of sinusoidal waveform to control a motor driving the analyser and have used analogue methods of determining the phase shift in the output signal of the light detector. Efforts to improve such known polarisers have concentrated on attempts to improve the synchronism of the rotation of the analyser in relation to the controlling waveforms and attempts to obviate the inherent drawbacks in the analogue phase shift measurement. However, the known polarimeters remain relatively inaccurate.

It is an object of the present invention to provide an improved polarimeter using digital techniques.

SUMMARY OF THE INVENTION

Accordingly, the present invention provides a polarimeter which includes a polariser having a fixed orientation and an analyser which is rotatable about its axis, in which polarimeter a motor is arranged to rotate the analyser and is driven in synchronism with digital clock pulses so that the rotation of the analyser is synchronised with such digital clock pulses.

Conveniently, the motor is a stepper motor which is driven in synchronism with the digital clock pulses so that each step of the motor corresponds to a predetermined number of clock pulses.

In a polarimeter embodying the invention, the phase of an output signal from a light detector responsive to the intensity of light transmitted by the analyser is compared with the phase of a digital signal derived from the clock pulses to determine the optical activity of a sample disposed between the polariser and the analyser.

According to a preferred form of the invention, a first digital signal derived from the clock pulses is maintained in a fixed phase relationship with respect to the output signal of the light detector and the phase of the said first digital signal is compared with the phase of a second digital signal which is also derived from the clock pulses.

Advantageously, the optical activity is determined by a counter which is enabled to count the block pulses during a period when the first and second digital signals have the same logic state.

The first digital signal may be derived from the clock pulses by means of a first divider the phase of whose output signal is controlled by a phase detector which compares the phase of the output signal delivered by the light detector with the phase of the output signal of the first divider.

The second digital signal may be derived from the clock pulses by means of a second divider, means being provided to start the second divider in synchronism with the first divider.

The invention also provides a polarimeter which includes a polariser having a fixed orientation, an analyser which is rotatable about its axis and means for rotating the analyser at constant speed, in which polarimeter the phase of an output signal from a light detector responsive to the intensity of light transmitted by the analyser is compared with the phase of a digital signal in phase with the rotation of the analyser to determine the optical activity of a sample disposed between the polariser and the analyser.

BRIEF DESCRIPTION OF THE DRAWING

In order that the invention may be readily understood, an embodiment thereof will now be described, by way of example, with reference to the accompanying drawing, in which the single FIGURE is a schematic block diagram of a polarimeter embodying the invention.

DESCRIPTION OF THE PREFERRED EMBODIMENT

Referring to FIG. 1, a polarimeter embodying the invention includes a light source 1 constituted by a tungsten filament lamp and a collimator. The collimated light from the source 1 passes in turn through a narrow band precision interference filter 2, a polariser 3 having a fixed optical orientation and an analyser 4 which is rotatable about its axis. A light detector 5, in the form of a photo-voltaic silicon diode operated in the current mode, detects the intensity of the light transmitted by the analyzer and delivers an electrical output signal proportional to the detected light intensity. A sample 6, the optical activity of which is to be measured, can be introduced between the polariser 3 and the analyser 4.

In use, the analyser 4 is rotated at constant speed, so that the output electrical signal of the detector 5 has a $Sin^2$ waveform of two cycles per revolution of the analyser. When an optically active sample 6 is introduced between the polariser and analyser, the phase of the $Sin^2$ waveform is shifted relative to the angular position of the analyser by an amount which is proportional to the optical rotation produced by the sample 6. This shift in phase is measured by the polarimeter to determine the optical activity of the sample.

The analyser 4 is rigidly connected to the rotor of a stepper motor 7 which is driven in synchronism with digital clock pulses delivered by a clock 8 so that each step of the motor corresponds to a predetermined number of clock pulses. The output of the clock 8 is reduced in frequency by a factor of 1500 in a frequency divider 9 and is then applied to the stepper motor 7 via motor drivers 24. The motor 7 performs 48 steps per revolution so that 72000 cycles of the clock 8 are required for each motor revolution, each clock cycle therefore representing an angle of 5 thousandths of a degree.

The light detector 5 produces a current output which is converted to a corresponding voltage in a current-to-voltage converter 10. The resulting output voltage of the converter 10 is amplified by an amplifier 11, provided with automatic gain control to compensate for substantial signal attenuation which can occur when using light-absorbing sample, and fed to a phase-error detector 12 which also receives the output of a variable frequency divider 13 connected to the clock 8. The variable divider 13 divides the frequency of the clock pulses by 36000 to obtain a first digital signal having a frequency identical to that of the output signal delivered by the light detector 5. The phases of the first digital signal and the output signal of the light detector 5 are compared in the phase-error detector 12 which delivers an error signal to a voltage-to-frequency converter 14 connected to control the variable divider 13 so as to vary the phase of the first digital signal. The phase-error detector 12 and the converter 14 maintain the first digital signal exactly 90° out of phase with the output signal of the light detector 5.

A reference frequency divider 15 is also connected to the clock 8 and serves to divide the frequency of the clock pulses by 36000 to provide a second digital signal having a frequency identical to that of the output signal of the light detector 5. The reference divider 15 is free-running. However, the reference divider 15 can be synchronised with the variable divider 13 by depressing a reset push button 16 connected to a reset device 17. When the button 17 is depressed, the reference divider 15 is reset and re-started in synchronism with the first digital signal delivered by the variable divider 13.

A normally disabled counter 18 has a count input connected to the clock 8 and a control input connected to a phase difference detector 19 which receives the first and second digital signals from the variable and reference dividers respectively. The difference detector compares the first and second digital signals during each cycle of the first digital signal and enables the counter 18 for the part of each cycle during which the first and second signals are both in the logic 1 state, such part of the cycle corresponding to the phase difference between the first and second digital signals and hence to the phase shift of the output signal of the light detector 5 relative to the phase of the clock pulses. The number of clock pulses counted each cycle by the counter 18 thus gives an accurate indication of the phase shift.

The count achieved by the counter 18 is transferred at the end of each cycle to a display device 20 where the count is recorded in a memory and used to drive a digital display. By changing the division ratios of the three frequency dividers 9, 13 and 15, different scale factors can be obtained. The frequency of the clock 8 is selectable within a range of 270 KHz to 500 KHz to provide about four revolutions per second of the analyser regardless of the scale factor selected.

A polarity detector 23 stores the logic state of the reference divider 15 which is present during the positive-going transition of the output signal of the variable divider 13 to indicate the phase relationship between the output signals of the two dividers and thus the polarity of the optical activity of the sample.

The output signal of the light detector 5 is monitored by a low signal detector 21 which causes the digital display of the device 20 to flash if the strength of such output signal is insufficient.

A velocity feedback is applied to the phase-error detector 12 by a velocity feedback generator 22 which monitors the output signal of the voltage-to-frequency converter 14 and the output signal of the amplifier 11 and which produces negative feedback proportional to the amplitude of the output signal of the amplifier and to the magnitude of the error signal from converter 14.

Various modifications can be made in the above described embodiment of the invention without departing from the spirit and scope of the present invention. For example, whilst the polariser 3 of fixed orientation precedes the rotatable analyser 4 in the light path from light source 1 to light detector 5 in the above described embodiment, it is envisaged that the rotatable analyser 4 may precede the fixed orientation polariser 3 in other embodiments of the invention.

I claim:

1. In a polarimeter including:
a polariser having a fixed orientation; an analyser mounted for rotation about its axis; a motor for rotating said analyser; a clock for providing digital clock pulses at a predetermined frequency; means for driving said motor in synchronism with said digital clock pulses so that rotation of said analyser is synchronized with said clock pulses; a light detector responsive to the intensity of light transmitted through said polariser and said analyser and providing an output signal having a given frequency; and means for determining the phase of said light detector output signal with respect to the phase of a digital signal of said given frequency derived from said clock pulses, whereby the optical activity of a sample disposed between said polarimeter and said analyser is determined;
the improvement comprising:
said motor being a stepper motor, said driving means driving said stepper motor in synchronism with said digital clock pulses so that each step of said motor corresponds to a predetermined number of clock pulses; and said phase determining means comprising means for deriving a first digital signal of said given frequency from said clock pulses, means for maintaining said first digital signal in a fixed phase relationship with respect to said light detector output signal, means for deriving a second digital signal of said given frequency from said clock pulses, and means for comparing the phase of said first and second digital signals.

2. A polarimeter as claimed in claim 1, further including:
a counter having a count input for receiving said clock pulses from said clock and an enable input for enabling said counter to count said clock pulses; the output of said phase comparing means being connected to said enable input for enabling said counter during a period when said first and second digital signals have the same logic state.

3. A polarimeter as claimed in claim 1, wherein:
said first digital signal deriving means comprises a first frequency divider having an input to receive said clock pulses from said clock and an output at which said first digital signal is delivered; and
said phase maintaining means comprises a phase detector connected to compare the phase of said light detector output signal with said first digital signal and to control said first frequency divider to maintain the phase of said first digital signal in said fixed phase relationship with said light detector output signal.

4. A polarimeter as claimed in claim 3, wherein:
said second digital signal deriving means comprises a second frequency divider having an input to receive said clock pulses from said clock and an output at which said second digital signal is delivered;

and further including means for starting said second frequency divider in synchronism with said first frequency divider.

5. In a polarimeter including:

a polariser having a fixed orientation; an analyser mounted for rotation about its axis; means for rotating said analyser at constant speed; and a light detector responsive to the intensity of light transmitted through said polariser and said analyser and providing an output signal of a given frequency; the improvement comprising:

means for providing a first digital signal of said given frequency; means for maintaining said first digital signal in a fixed phase relationship with respect to said light detector output signal; means for providing a second digital signal of said given frequency and in phase with the rotation of said analyser; and means for comparing the phase of said first and second digital signals to determine the optical activity of a sample disposed between said polariser and analyser.

* * * * *